United States Patent [19]

Schmidt

[11] 4,141,397
[45] Feb. 27, 1979

[54] CHUCK ASSEMBLY FOR A VENEER LATHE

[76] Inventor: Charles J. Schmidt, P.O. Box 757, Diboll, Tex. 75941

[21] Appl. No.: 861,223

[22] Filed: Dec. 16, 1977

[51] Int. Cl.² .......................... B27C 7/04; B27L 5/00
[52] U.S. Cl. .................................. 144/209 R; 142/53; 142/55; 279/1 A
[58] Field of Search .......................... 142/53, 55, 57; 144/209; 279/1 A; 82/40

[56] References Cited

U.S. PATENT DOCUMENTS

| | | | |
|---|---|---|---|
| 891,602 | 6/1908 | De Marey | 142/53 |
| 1,706,178 | 3/1929 | Mattison | 142/55 |
| 2,879,816 | 3/1959 | Cook et al. | 144/209 |
| 3,044,511 | 7/1962 | Wieckman et al. | 144/209 |
| 3,132,673 | 5/1964 | Bamford | 144/209 |
| 3,323,566 | 6/1967 | Hitt | 144/209 |
| 3,513,891 | 5/1970 | Heth | 144/209 |

*Primary Examiner*—Leonidas Vlachos
*Attorney, Agent, or Firm*—Fulbright & Jaworski

[57] ABSTRACT

A chuck assembly for attachment to a drive spindle of a veneer lathe including a drive adapter and a chuck. The drive adapter includes a connection for attachment to the drive spindle and a driving head for attachment to the chuck. The chuck includes first and second ends with the first end having a recess sized and shaped to fit over the driving head of the drive adapter. Releasable fastening means extends between the first end of the chuck and the driving head through the side of the chuck for releasably fastening the chuck to the driving head for allowing easy replacement of the chuck head. The second end of the chuck includes a plurality of blades each of which includes an outer edge extending from the longitudinal axis of the chuck radially outwardly to the outside of the chuck and also extending outwardly from the second end of the chuck, and each of the blades includes a first flat side longitudinally extending from the outer edge with the flat side being on the leading face of the blade in the direction of rotation thereby providing an enlarged and effective driving area. The second side of each of the blades extends from its outer edge to the first side of the adjacent blade thereby providing a self-cleaning recess. The releasable fastener between the chuck and the driving head includes a plurality of indentations in the outer periphery of the driving head and a plurality of screws extending to the side of the chuck and engaging one of the indentations.

7 Claims, 5 Drawing Figures

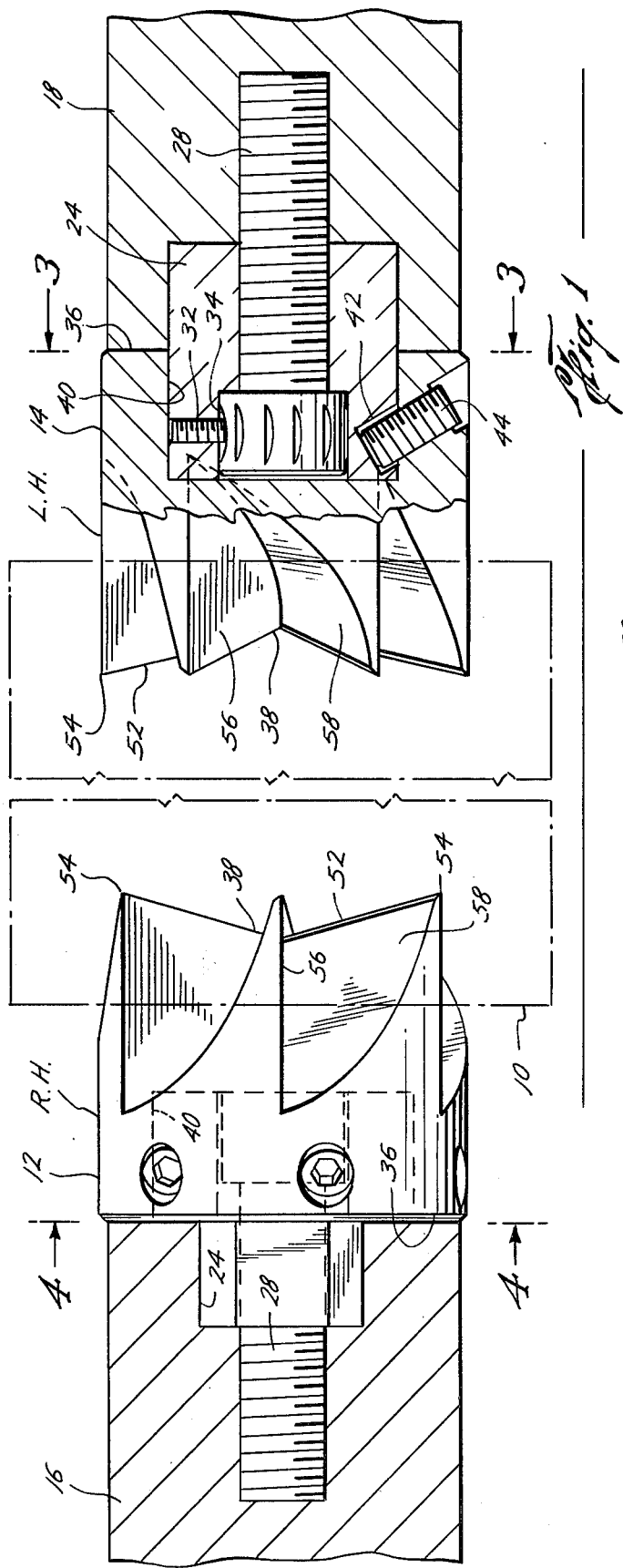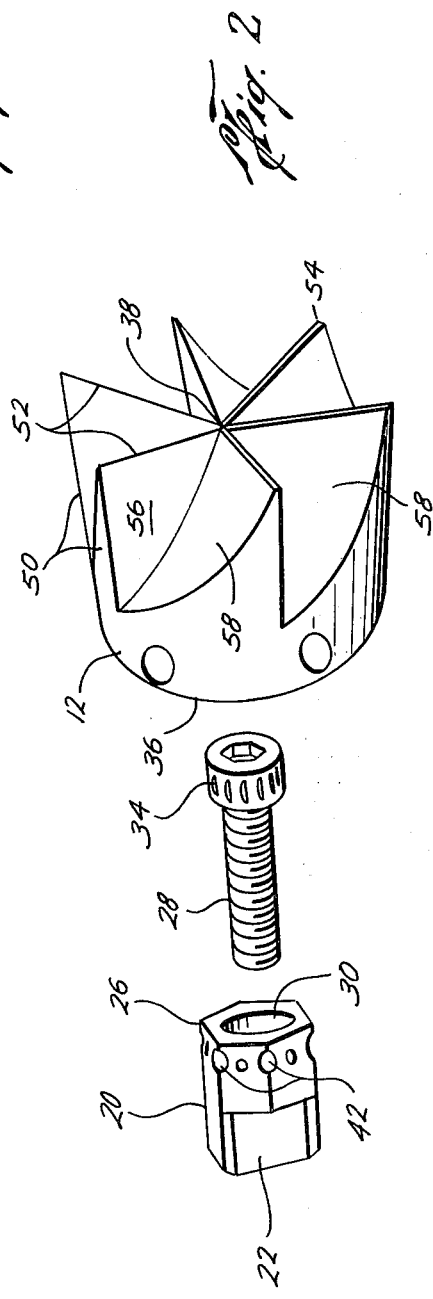

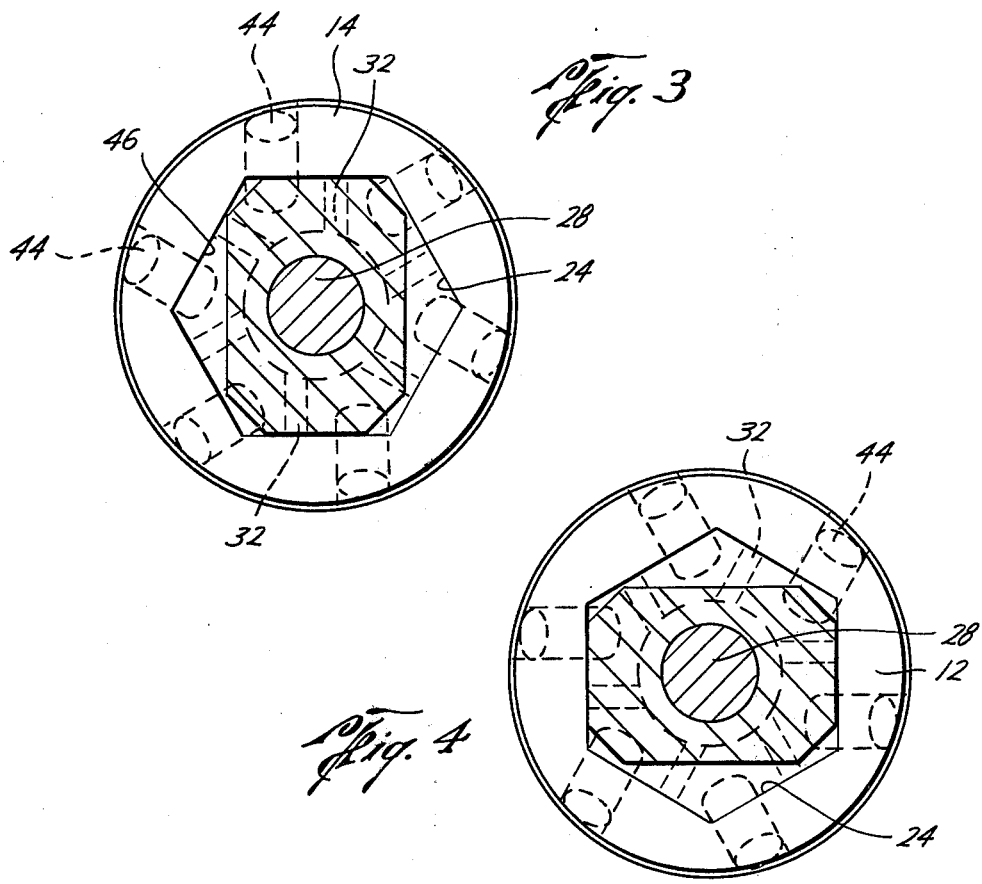
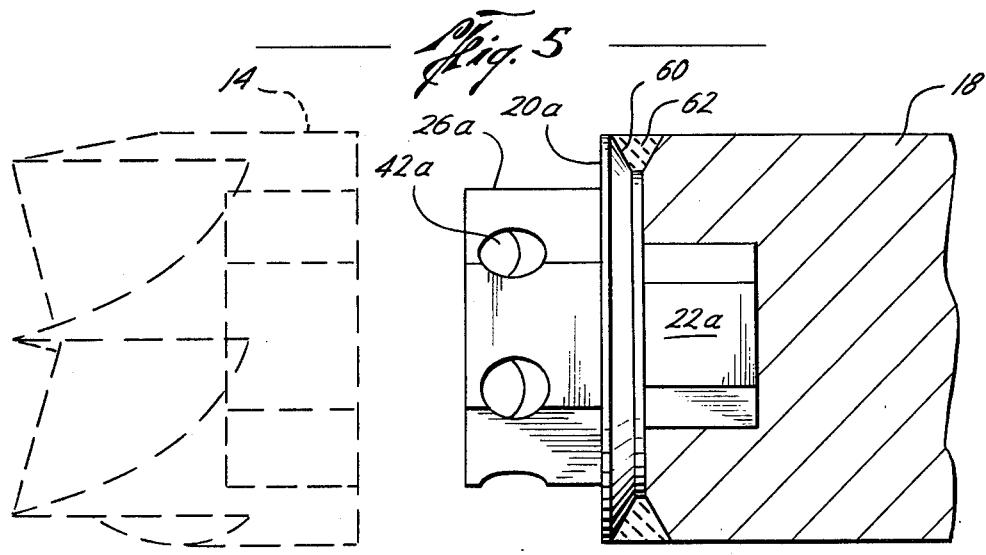

CHUCK ASSEMBLY FOR A VENEER LATHE

BACKGROUND OF THE INVENTION

It is old to support logs in a plywood lathe chuck for cutting veneer from the logs from the outer diameter thereof in which the ends of the logs are supported by chucks attached to the rotary spindles of the lathe as illustrated in the following patents: U.S. Pat. Nos. 2,879,816; 3,044,511; 3,132,673; 3,323,566; and 3,513,891. However, the prior art chucks for holding the logs have been less than satisfactory in that they have been difficult to clean, have been subject to clogging up with the wood cuttings and resin, are difficult to replace, have had an insufficient driving area and therefore are subject to spinning out or failing to securely grip the logs, and have lacked sufficient blade strength.

The present invention is directed to an improved chuck assembly for attachment to a drive spindle of a veneer lathe in which the chuck is self-cleaning, has a greater driving area for avoiding spin-outs, is easily replaceable, is securely fastened in position, and has a stronger blade structure for increased life.

SUMMARY

The present invention is directed to a chuck assembly for attachment to a drive spindle of a veneer lathe which includes a drive adapter for connection to the drive spindle and a chuck for releasable connection to the drive adapter. The drive adapter may be suitably connected to the drive spindle by a threaded bolt or by a weldable connection. The drive adapter includes a driving head which includes a plurality of flat-sided surfaces about its circumferential periphery for driving a chuck.

One feature of the present invention is the provision of a chuck having first and second ends in which the first end has a recess sized and shaped to fit over the driving head of the drive adapter which shields the driving head from exposure to the wood cuttings and resin. In addition, releasable fastening means extends between the first end of the chuck and the driving head through the side of the chuck for releasably fastening the chuck to the driving head whereby the releasable fastening means are not pushed into the log and filled with wood chips and resin under pressure, but are readily and easily releasable for replacing the chuck head.

Another feature of the present invention is the provision of the second end of the chuck including a plurality of blades each of the blades including an outer edge extending from the longitudinal axis of the chuck radially outwardly to the outside of the chuck thereby providing a large engaging area with the log. In addition, the outer edges of the blade extend outwardly away from the second end of the body whereby a greater driving force is obtained because the outside edges of the blades enter deeper into the log.

Another feature of the blades is that each of the blades includes a first flat side longitudinally extending from its edge and being on the leading face of the blade in the direction of rotation thereby providing an increased driving area of the blades against the log.

A still further object of the present invention is the provision of the feature of the second side of each of the chuck blades extending from its outer edge to the first side of an adjacent blade thereby providing a recess which is self-cleaning as the chuck is compressed inwardly against the end of the log.

Still a further object of the present invention is the provision of improved releasable fastening means having a plurality of indentations in the outer periphery of the driving head and a plurality of screws extending through the side of the chuck and engaging one of the indentations. Preferably, the longitudinal axis of the screws and indentations are at an angle to the side of the chuck which is directed from the second end of the chuck towards the first end of the chuck for assisting in retaining the chuck longitudinally on the driving head. Also preferably the longitudinal axis of the screws and indentations are at an angle offset from the longitudinal axis of the driving head for removing slack between the chuck and the driving head.

Still a further object of the present invention is the provision wherein the drive adapter includes a noncircular tang for engagement with the drive spindle and a bolt extends through the drive adapter for connection with the drive spindle with the head of the bolt being recessed in the drive spindle with screw means connecting the drive adapter and the head of the bolt for holding the bolt in place with the screws being recessed in the drive adapter thereby avoiding interference with the chuck.

Other and further objects, features and advantages will be apparent from the following description of presently preferred embodiments of the invention, given for the purpose of disclosure and taken in conjunction with the accompanying drawings.

BRIEF DESCRIPTION OF THE DRAWINGS

FIG. 1 is an elevational view, partly in cross section, illustrating a log being held in between two chucks of the present invention, FIG. 2 is a perspective exploded view of a right-handed chuck assembly of the present invention, FIG. 3 is a cross-sectional view taken along the line 3—3 of FIG. 1, FIG. 4 is a cross-sectional view taken along the line 4—4 of FIG. 1, and FIG. 5 is a fragmentary elevational view of a chuck of the present invention showing a modified structure for attaching the drive adapter to a drive spindle.

DESCRIPTION OF THE PREFERRED EMBODIMENT

Referring now to the drawings and particularly to FIG. 1, a wood log 10 shown in dotted outline is secured between a right-handed chuck 12 and a left-handed chuck 14 in a conventional plywood veneer lathe. Each of the chucks 12 and 14 are supported from a drive spindle such as drive spindles 16 and 18, respectively. As described in U.S. Pat. No. 2,879,816, the drive spindles 16 and 18 are axially extended, such as hydraulic cylinders to drive the chucks 12 and 14 into opposite ends of a log 10 and are thereafter rotated and plywood veneer is peeled from the outer circumference of the log 10. The right-handed chuck 12 and the left-handed chuck 14 are identical except for the direction of the blades thereon.

The chuck assembly of the present invention includes a drive adapter 20 and a chuck such as the right-handed chuck 12 or the left-handed chuck 14. The drive adapter 20 has means for connection to a drive spindle such as 16 or 18 and may include a rectangular tang 22 for insertion into a coacting recess 24 in the spindle. The drive adapter 20 also includes a driving head 26 which includes a plurality of flat-sided surfaces about its circumferential periphery for driving the chucks 12 and 14. For example, a hexagon shaped driving head has been found satisfactory. The drive adapter 20 may be suitably secured to the driving spindles 16 and 18 by any suitable means, and as shown in FIGS. 1-4 may include a bolt 28 which extends through a recess 30 in the adapter 20 and is threadably connected to the drive spindles 16 and 18. As best seen in FIG. 1, a plurality of lock screws 32 extend through the drive adapter 20 and into recesses 34 in the head of the bolt 28 for securing the drive adapter 20, and bolt 28 to the drive spindles 16 and 18. Each of the chucks 12 and 14 include a first end 36 and a second end 38. The first ends 36 include a recess 40 which is sized and shaped, here shown as a hexagon, to fit over the driving head 26 of the coacting drive adapter 20.

It is to be noted that as the drive spindles 16 and 18 are axially moved into the log 10 and during the veneer cutting operation, wood cuttings and resin may accumulate on the chucks 12 and 14 and spindles 16 and 18, but the recesses 40 of the chucks 14 and 16 cover and prevent the accumulation of debris on the drive adapters 24 thereby allowing the drive adapters 24 to be easily removed, if desired, after removal of the chucks 12 and 14.

Releasable fastening means are provided extending between the first ends 36 of the chucks 12 and 14 and the driving heads 26 of their coacting drive adapters 20. Preferably, such releasable fastening means include a plurality of indentations 42 in the outer periphery of the driving head 26 through which a plurality of allenhead screws 44 extend through the side of the chucks for engaging one of the indentations 42. As best seen in FIG. 1, the longitudinal axis of the screws 44 and indentations 42 are at an angle to the side of the chucks 12 and 14 and directed at an angle, such as 30° from the first end of the chucks towards the second end 38 of the chucks thereby assisting in retaining the chucks 12 and 14 longitudinally on the driving heads 26. In addition, as best seen in FIG. 3, the longitudinal axis of the screws 44 and indentations 42 are at an angle offset from the longitudinal axis of the driving head 20 which tends to remove any slack between the driving heads 26 and the internal recesses 40 of the chucks 12 and 14 and provide a more rigid driving connection to the chucks 12 and 14.

It is to be noted that the fastening screws 44 are through the side of the chucks 12 and 14 for attaching the chucks 12 and 14 to the driving heads 26. In some prior art devices the chucks are sometimes secured to the drive adapter by a center bolt through the longitudinal axis of the chuck. However, such a center bolt fastening structure is subjected to repeated build-up of wood chips and resin which are compacted when the chucks are longitudinally pushed into the ends of the logs 10 thereby making the removal of the chucks difficult, and restricting the proper penetration of the chucks into the log longitudinally, therefore causing more frequent spin-outs and the loss of veneer production. However, in the present device with the fastening screws 44 on the side they are not subjected to wood chips and resin being compressed thereon when the chucks 12 and 14 are longitudinally pushed into the logs. The screws 44 may be easily removed and replaced from the drive adapter 20 when desired.

The second ends of each of the chucks 12 and 14 include a plurality of blades 50. Each of the blades 50 includes an outer edge 52 extending from the longitudinal axis of the chuck radially outwardly to the outside periphery of the chucks thereby providing a large engaging edge for biting into and securely holding the ends of the log 10. In addition, the edges 52 also extend outwardly away from the second end 38 of the chucks 12 and 14, for example, 20°, whereby the extreme outside points 54 of the edges 52 will penetrate deeper into the ends of the log 10 than the inside of the outer edges 52 to allow a greater torque force to be applied from the chucks 12 and 14 to the logs 10. Furthermore, each of the blades 50 includes a first flat side 56 longitudinally extending from its outer edge 52 toward the first ends 36 of the chucks 12 and 14. The flat sides 56 of the blades are positioned on the leading face of the blades 50 in their direction of rotation thereby providing a large driving area between the chucks 12 and 14 and the log 10. It is therefore noted that the flat sides 56 are on one side of the blades 50 for the right-handed chuck 12 and are on the opposite sides of the blades 50 for the left-handed chuck 14. The second side 58 of each of the blades 50 extends from its outer edge 52 to the first side 56 of an adjacent blade thereby providing a recess between adjacent blades 50 which decreases in cross-section size from the second end 38 of the chucks 12 and 14 towards the first end 36 thereby providing a self-cleaning recess. That is, as the chucks 12 and 14 are longitudinally actuated to engage a new log 10 any accumulation of wood chips and resin between the blades 50 will be extruded away from the outer edges 52 of the chucks 12 and 14 as the chucks are longitudinally moved into engagement of the ends of a new log 10. This allows a new log to be inserted between the chucks 12 and 14 without the time-consuming necessity of cleaning the accumulated material from the second ends 38 of the chucks 12 and 14 as required in prior art devices.

As indicated in FIGS. 1-4, the drive adapters 20 may be secured to the drive spindles 16 and 18 by threaded means such as the bolts 28. A further modification is illustrated in FIG. 5 of a drive adapter 20a in which the means for connection to the drive spindle, such as 18, is by means of a welded connection in which a circular beveled surface 60 is provided between the tang 22a and the driving head 26a whereby a weld 62 may be provided to secure the drive adapter 20a to the drive spindle 18.

The present invention, therefore, is well adapted to carry out the objects and attain the ends and advantages mentioned as well as others inherent therein. While presently preferred embodiments of the invention are given for the purpose of disclosure, numerous changes in the details of construction and arrangement of parts will readily suggest themselves to those skilled in the art and which are encompassed within the spirit of the invention and the scope of the appended claims.

What is claimed is:

1. A chuck assembly for attachment to a drive spindle of a veneer lathe comprising,
    a drive adapter having means for connection to the drive spindle and having a driving head,
    a chuck having first and second ends,
    said first end having a recess sized and shaped to fit over the driving head of the drive adapter,
    releasable fastening means extending between the first end and the driving head through the side of the chuck for releasably fastening the chuck to the driving head, said second end of the chuck including a plurality of blades, each of the blades including an outer edge extending from the longitudinal axis of the chuck radially outwardly to the outside of the chuck and also extending outwardly from the second end of the chuck, each of said blades including a first flat side longitudinally extending from its edge, said flat side being on the leading face of the blade in its direction of rotation thereby providing a driving area, the second side of each of the blades extending from its outer edge to the first side of an adjacent blade thereby providing a self-cleaning recess.

2. The apparatus of claim 1 wherein the releasable fastening means includes,
- a plurality of indentations in the outer periphery of the driving head, and
- a plurality of screws extending through the side of the chuck and engaging one of the indentations.

3. The apparatus of claim 2 wherein the longitudinal axis of the screws and indentations are at an angle to the side of the chuck which is directed from the first end of the chuck towards the second end of the chuck for assisting in retaining the chuck longitudinally on the driving head.

4. The apparatus of claim 2 wherein the longitudinal axis of the screws and indentations are at an angle offset from the longitudinal axis of the driving head.

5. The apparatus of claim 1 wherein the driving head includes a plurality of flat sided surfaces about its circumferential periphery.

6. The apparatus of claim 1 wherein the drive adapter includes,
- a non-circular drive tang for engagement with the drive spindle,
- a bolt extending through the drive adapter for connection with the drive spindle, the head of the bolt being recessed in the drive spindle, and
- screw means connected between the drive adapter and the head of the bolt for holding the bolt in place, said screws being recessed in said drive adapter thereby avoiding interference with the chuck.

7. The apparatus of claim 1 wherein the drive adapter includes,
- a non-circular drive tang for engagement with the drive spindle, and
- a circular beveled surface between the tang and the driving head for welding to the drive spindle.

* * * * *